Nov. 23, 1937.   A. H. EMERY   2,099,930
SHOCKPROOF ATTACHMENT FOR DIAL INDICATORS
Filed June 15, 1936
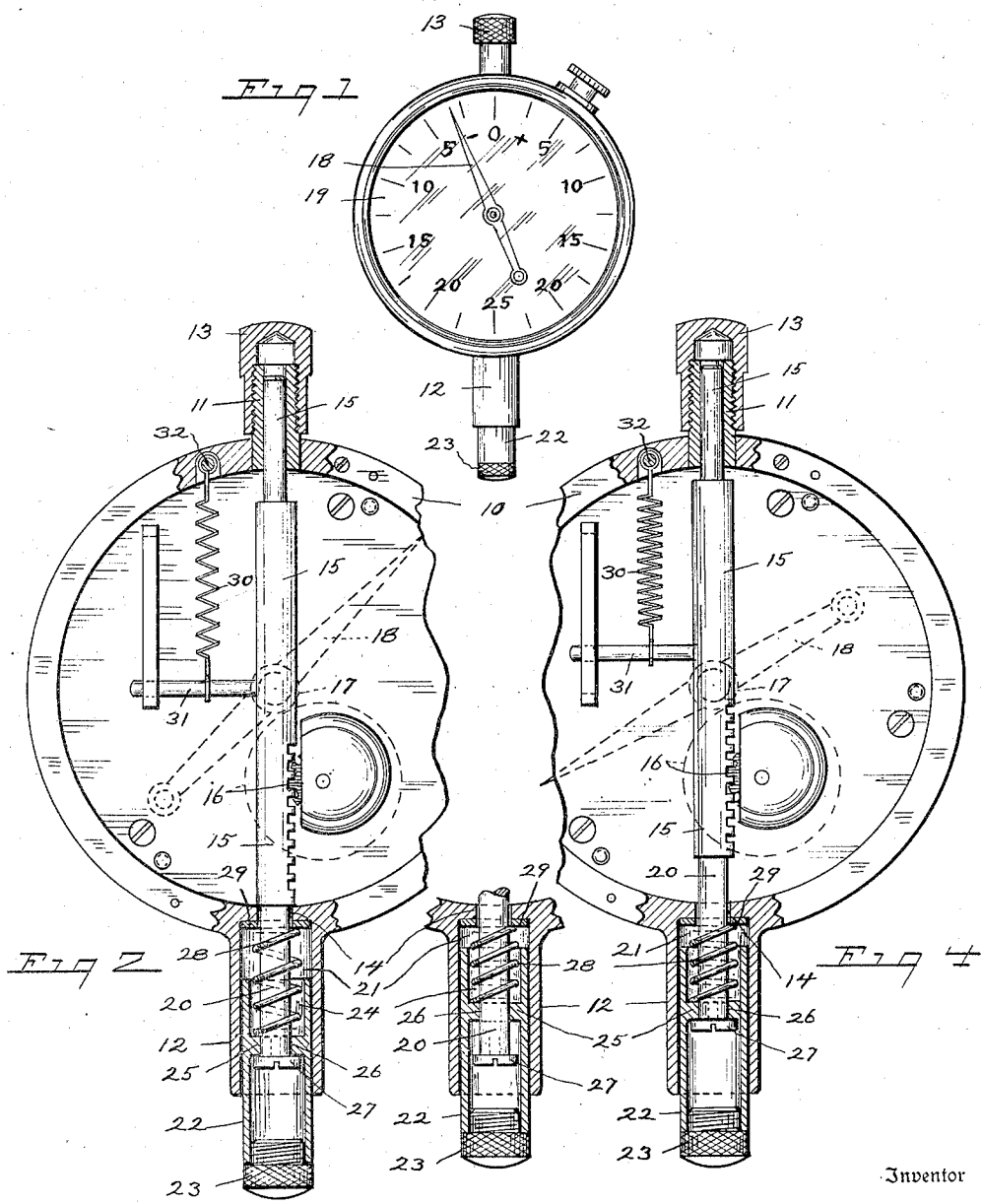
Inventor
Alfred H. Emery.
By John J. Thompson
Attorney Patented Nov. 23, 1937

2,099,930

UNITED STATES PATENT OFFICE 2,099,930

SHOCKPROOF ATTACHMENT FOR DIAL INDICATORS

Alfred H. Emery, Poughkeepsie, N. Y., assignor to Standard Gage Company, Inc., Poughkeepsie, N. Y., a corporation of New York Application June 15, 1936, Serial No. 85,340

3 Claims. (Cl. 33—172)

This invention relates primarily to a gear driven dial indicator and more particularly to an attachment for a dial indicator whereby all of the delicate indicating mechanism is protected against damage from a shock, and the life of the instrument is thus prolonged, and undue wear eliminated.

In gear driven dial indicators of the usual type, when the hand operating plunger is brought into direct contact with the work, shocks, knocks and the like, sustained by the plunger are transmitted directly through the rack to the gears, thereby producing wear, and in time affecting the accuracy of the instrument.

Where dial indicators are used in high production work, they are subjected to hard knocks and blows which are transferred from the work contact plunger to the gearing and delicate mechanism of the instrument, which not only shortens the life of the instrument but tends to cause inaccuracy.

To overcome these defects, I have devised an attachment for a dial indicator, whereby the instrument will retain its accuracy under undue shocks and its life will be prolonged under hard usage.

The object of the invention is to provide means in the form of an attachment including a shock absorbing work contacting plunger, non-rigidly connected to the indicator plunger in a normally extended position, but upon being brought into contact with the work in the usual manner, and upon receiving a blow or shock will release the indicating plunger as actuated by the indicator mechanism to give a correct reading of the measurement.

Another object of the invention is to provide a shock absorbing device that may be readily attached to the usual type of dial indicator without making any material changes in its construction and design.

Another object of the invention is to provide a shock absorbing device that shall be simple, durable, efficient, and contain few parts, all of which are contained within the stem and in no manner attached to the dial indicating mechanism.

With these and other objects in view, my invention consists in certain novel construction and combination of parts as will hereinafter be fully described and claimed and further illustrated in the accompanying drawing which forms a part hereof, and in which like figures of reference refer to corresponding parts in all of the views, and it is understood that slight changes may be made without departing from the spirit of the invention.

In the drawing:

Figure 1 is a front elevation of a dial indicator embodying the device.

Figure 2 is an enlarged rear view of the dial indicator shown partly in section to illustrate the construction and application of the shockproof attachment, and showing the same in its normal extended position.

Figure 3 is a partial view of the same, but illustrating the position assumed by the several parts upon receiving a hard blow or shock, and before the dial plunger has had time to operate.

Figure 4 is a similar view, but showing the position of the parts during the act of measuring and also just subsequent to a blow or shock.

The indicator herewith shown, is composed of the body ring 10, formed with the two aligned diametrically opposite tubular bearing stems 11 and 12; and the stem 11 being provided with a threaded cap 13 for closing the outer end thereof; while the lower stem 12 is provided with a clearance bearing 14 within which, and the bearing 11 is slidably mounted the combined rack plunger 15 and the contact plunger 20 which, through the usual train of gearing 16 rotates the pinion 17 and causes the hand 18 to move over the face of the dial 19.

In the usual indicator, the contact plunger 20 which is an extension of and forms a part of the rack plunger 15 would project beyond the end of the stem 12 and be brought into direct contact with the work, and thus all knocks and blows sustained thereby would be transmitted directly to the sensitive gearing and mechanism of the instrument, and in some designs of shockless indicators, the shockproof device comprises springs and gearing built into and forming an integral part of the indicator mechanism and while the blows are cushioned to some extent, they are transmitted to a portion of the gearing, which will produce wear and hence in time, inaccuracy.

To overcome these objections and defects, I have devised an attachment which is contained within the lower stem 12 and which receives all of the force of the blow without in any manner transferring it to the contact plunger or other indicating mechanism of the indicator, thus prolonging the life of the instrument and in no manner impairing its accuracy.

To accomplish this, I have counterbored the lower stem 12 as at 21 and have mounted therein a sliding combined shock and contact plunger 22 which is tubular in form and internally threaded at its lower end for a contact plug 23 which may be interchanged with plugs of different lengths, shapes and forms.

The upper end of this tubular shock absorber 22 is open as at 24 and divided from the lower end by a transverse wall 25 formed with an axial bore 26 forming a sliding fit and bearing for the lower end of the plunger 20 which extends therethrough and has free telescoping movement therein limited in one direction by a screw 27 which is threaded into the lower end of the plunger 20 with its shoulder normally in contact with the wall 25, and in the opposite direction is cushioned by a compressing coil 28 one end of which bears against the wall 25, and the other end against a thrust washer 29 located in the counterbore 21.

The rack plunger 15 in place of being normally retained in an extended position by a contraction spring 30 is normally retained in a receded position by attaching said spring 30 between the pin 31 and the pin 32 in the upper part of the ring 10, in place of between the pin 31 and the lower part of the ring 10 as shown in Patent No. 1,937,936, thus tending to pull the rack and contact plunger 20 upward and inward against the action of the spring 28, the spring 30 being weaker than the spring 28, so that normally the action of the spring 28 will overcome the action of the spring 30 and the hand 18 will rest at zero.

When a blow is struck against the plug end 23 of the shock absorber 22, it is forced inwardly against the spring 28 and slides inward on the plunger 20 and within the bore 21 of the stem 12 releasing it and without imparting any blow or movement to said plunger 20, while at the same time, due to the compression of the spring 30 causing the released plunger 20 to follow up the movement of the shock absorber 22, keeping the shoulder of the screw 27 in contact with the wall 25, and through the gearing, moving the hand 18 over the face of the dial 19 of the indicator.

Having thus described my invention, what I claim is new and desire to secure by Letters Patent, is:

1. A shock absorber for gear driven dial indicators having a tubular casing stem, a rack-plunger extending therein and means for normally retaining said plunger in a receded position, of a shock absorbing member slidably mounted within said tubular stem and upon said plunger, means for positively limiting the outward movement of said member with respect to the plunger and means for cushioning the inward movement of said member with respect to the stem and without imparting movement to the plunger, but permitting its further inward movement.

2. In a shock proof gear driven dial indicator of the class described and in combination with an indicator having a tubular counterbored stem, a rack-plunger extending into said stem and means for urging said rack plunger inwardly, of a combined shock receiving and contact member slidably mounted within said tubular stem, a contact plug detachably secured to the lower end of said member, a transverse wall formed in said member having an axial bearing for the rack-plunger, means for limiting the outward movement of said member with respect to the plunger, a spring surrounding said plunger and mounted within said member and the counterbore of the stem to urge said member outwardly from the stem and normally retain said transverse wall in engagement with the limiting means attached to the plunger, and for cushioning the inward movement of said member and allowing the rack-plunger to be retracted, upon moving said member inwardly releasing said plunger to independently follow up said movement.

3. In a shock absorbing attachment for a gear driven dial indicator of the class described, the combination with a dial indicator having a tubular counterbored stem, a rack-plunger for operating the indicating mechanism and a spring for normally urging the rack-plunger upward, of a combined shock absorbing and contact member slidably mounted within said tubular stem and formed with a bearing for the rack-plunger, means for limiting the outward movement of said member upon said plunger, means for cushioning the inward movement of the member upon said plunger and within the stem, comprising a spring mounted within the member and the counterbore and tending to urge the member and plunger outward against the action of the first mentioned spring, while upon inward movement of the member the outward tension of said plunger will be released so that it will follow up the inward movement of the member as actuated by its spring.

ALFRED H. EMERY.